(12) United States Patent
Wakita et al.

(10) Patent No.: US 8,216,726 B2
(45) Date of Patent: *Jul. 10, 2012

(54) BATTERY

(75) Inventors: Shinya Wakita, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 738 days.

This patent is subject to a terminal disclaimer.

(21) Appl. No.: 12/330,712

(22) Filed: Dec. 9, 2008

(65) Prior Publication Data

US 2009/0176163 A1    Jul. 9, 2009

(30) Foreign Application Priority Data

Jan. 9, 2008   (JP) .................................. 2008-002481

(51) Int. Cl.
    *H01M 6/16*   (2010.01)
(52) U.S. Cl. ..................... 429/331; 429/338; 429/199
(58) Field of Classification Search .................. 429/331, 429/338, 199
    See application file for complete search history.

(56) References Cited

U.S. PATENT DOCUMENTS

| | | | |
|---|---|---|---|
| 5,529,859 A * | 6/1996 | Shu et al. ...................... | 429/331 |
| 6,506,524 B1 * | 1/2003 | McMillan et al. ............. | 429/331 |
| 7,482,101 B2 * | 1/2009 | Tsuda et al. ................... | 429/331 |
| 7,709,142 B2 * | 5/2010 | Wakita et al. .................. | 429/331 |
| 2005/0014072 A1 * | 1/2005 | Yamaguchi et al. .......... | 429/329 |
| 2005/0031963 A1 | 2/2005 | Im et al. | |
| 2007/0148541 A1 * | 6/2007 | Wakita et al. ................. | 429/331 |
| 2008/0076032 A1 * | 3/2008 | Wakita et al. ................. | 429/342 |
| 2009/0246641 A1 * | 10/2009 | Deguchi et al. ............... | 429/326 |

FOREIGN PATENT DOCUMENTS

| | | |
|---|---|---|
| JP | 1990335 | 9/1987 |
| JP | 62 290071 | 12/1987 |
| JP | 5 325985 | 12/1993 |

(Continued)

OTHER PUBLICATIONS

Japanese Office Action (JP 2008-002481) issued on Dec. 8, 2009.

*Primary Examiner* — Helene Klemanski
(74) *Attorney, Agent, or Firm* — K&L Gates LLP

(57) ABSTRACT

A battery is provided. The battery includes an electrolytic solution, a positive electrode and a negative electrode. The negative electrode has a negative electrode active material layer containing a carbon material and having a thickness per one face of 70 μm or more and not more than 120 μm. The electrolytic solution contains a solvent containing 15% by mass or more and not more than 30% by mass of a cyclic carbonate represented by the following formula (1):

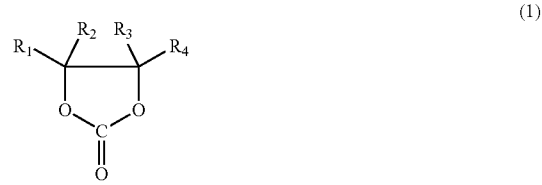

(1)

wherein $R_1$ to $R_4$ each independently represents hydrogen, a halogen, an alkyl group or a halogenated alkyl group. A mass content ratio (B/A) of a halogenated cyclic carbonate (B % by mass) contained in the cyclic carbonate (A % by mass) which is represented by the formula (1) being from 0.5 to 1.0.

4 Claims, 2 Drawing Sheets

FOREIGN PATENT DOCUMENTS

| | | |
|---|---|---|
| JP | 06-275321 | 9/1994 |
| JP | 7 11967 | 2/1995 |
| JP | 7 240232 | 9/1995 |
| JP | 08-115742 | 5/1996 |
| JP | 8 306364 | 11/1996 |
| JP | 9 204936 | 8/1997 |
| JP | 2701347 | 10/1997 |
| JP | 10-189043 | 7/1998 |
| JP | 11-040199 | 2/1999 |
| JP | 2007-504628 | 3/2007 |
| JP | 2007-188861 | 7/2007 |
| JP | 2007-250415 | 9/2007 |
| JP | 2007-335406 | 12/2007 |
| JP | 62 290072 | 12/2008 |
| JP | 2005-038722 | 2/2010 |
| WO | WO 2007/135974 A1 * | 11/2007 |

* cited by examiner

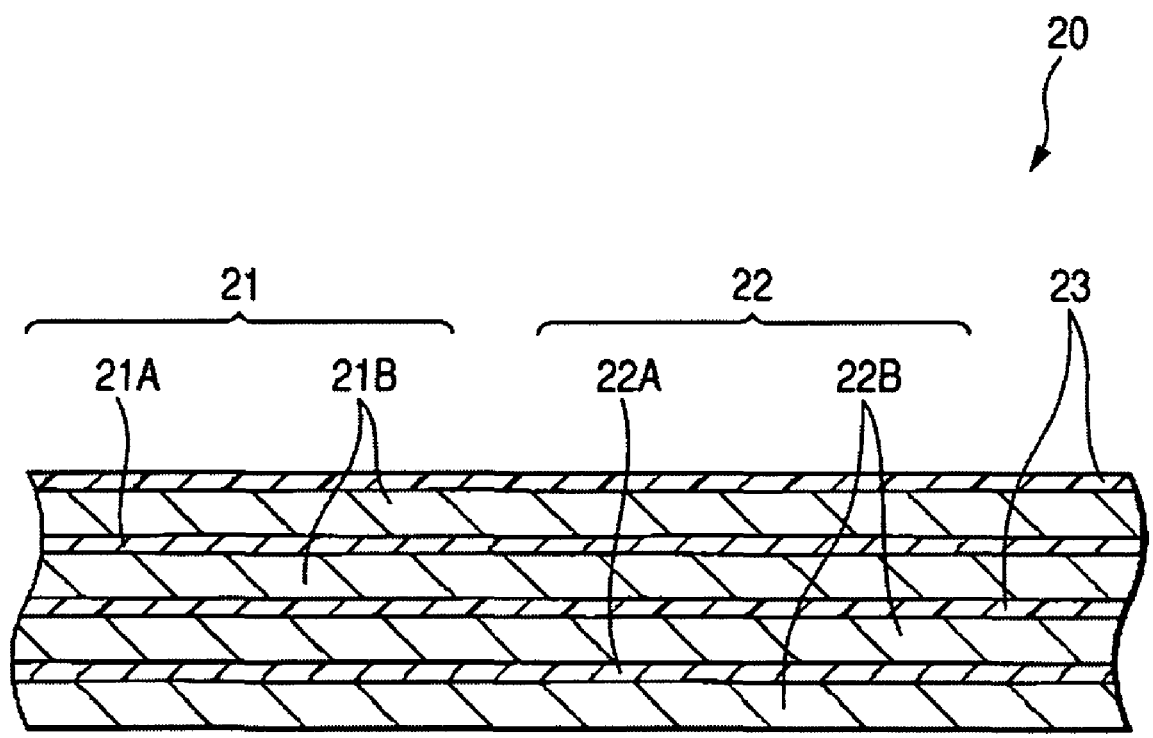

BATTERY

CROSS REFERENCE TO RELATED APPLICATIONS

The present application claims priority to Japanese Patent Application JP 2008-002481 filed in the Japan Patent Office on Jan. 9, 2008, the entire contents of which is being incorporated herein by reference.

BACKGROUND

The present application relates to a battery using a carbon material as a negative electrode active material.

In recent years, downsizing and weight saving of portable electronic devices represented by a mobile phone, PDA (personal digital assistant) and a laptop personal computer have been actively promoted. As a part thereof, an enhancement in energy density of a battery as a driving power source for such electronic devices, in particular, a secondary battery has been eagerly desired.

As a secondary battery capable of obtaining a high energy density, there are known, for example, secondary batteries using lithium (Li) as an electrode reactant. Above all, a lithium ion secondary battery using a carbon material capable of intercalating lithium in a negative electrode and deintercalating it therefrom is widely put into practical use.

However, in the lithium ion secondary battery using a carbon material for a negative electrode, technologies have already been developed to an extent close to a theoretical capacity thereof. Thus, as a method for further enhancing the energy density, there has been studied a method in which the thickness of an active material layer is increased, thereby increasing a proportion of the active material layer within the battery and decreasing a proportion of each of a collector and a separator (see, for example, JP-A-9-204936).

SUMMARY

However, when the thickness of the active material layer is increased without changing a volume of the battery, the area of the collector relatively decreases. Thus, there was involved a problem that a current density to be applied to the negative electrode at the time of charge increases, and diffusion of a lithium ion and electrochemical acceptance of a lithium ion in the negative electrode cannot keep up, whereby metallic lithium is easily deposited. In this way, the metallic lithium deposited in the negative electrode is easily deactivated, resulting in enormous lowering of cycle characteristics. Consequently, it has been difficult to increase the thickness of the active material layer.

Also, in an electrolytic solution, a solvent with a high dielectric constant such as cyclic carbonates is necessary for the purpose of dissolving a lithium electrolyte therein. However, in general, since a solvent with a high viscosity such as a cyclic carbonate is large in activation barrier accompanying desolvation on the surface of an active material at the time of charge and discharge, loading characteristics are lowered.

In view of the foregoing problems, it is desirable to provide a battery capable of obtaining a high energy density and also obtaining excellent cycle characteristics.

According to an embodiment, there is provided a battery including an electrolytic solution, a positive electrode, and a negative electrode, wherein the negative electrode has a negative electrode active material layer containing a carbon material and having a thickness per one face of 70 μm or more and not more than 120 μm, the electrolytic solution contains a solvent containing 15% by mass or more and not more than 30% by mass of a cyclic carbonate represented by the following formula (1):

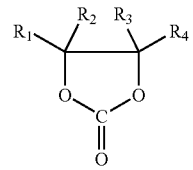

wherein $R_1$ to $R_4$ each independently represents hydrogen, a halogen, an alkyl group or a halogenated alkyl group, and a mass content ratio (B/A) of a halogenated cyclic carbonate (B % by mass) contained in the cyclic carbonate (A % by mass) which is represented by the formula (1) is from 0.5 to 1.0.

According to the battery of an embodiment, a high energy density can be obtained by increasing the thickness of the negative electrode active material layer. In addition, since the solvent in the electrolytic solution contains a halogenated cyclic carbonate, a coat is formed on the surface of the active material layer. Also, not only diffusion and acceptance of a lithium ion are enhanced, but decomposition of the electrolytic solution accompanying charge and discharge is inhibited. Also, since the mass content ratio (B/A) of the halogenated cyclic carbonate (B % by mass) contained in the cyclic carbonate (A % by mass) which is represented by the formula (1) is regulated at from 0.5 to 1.0, it is possible to decrease reaction activation energy accompanying desolvation on a negative electrode active material/electrolytic solution interface.

According to the battery of an embodiment, by increasing the thickness of the negative electrode active material layer, containing the halogenated cyclic carbonate in the electrolytic solution and regulating the mass content ratio (B/A) of the halogenated cyclic carbonate (B % by mass) contained in the cyclic carbonate (A % by mass) which is represented by the formula (1) at from 0.5 to 1.0, not only the energy density can be enhanced, but excellent cycle characteristics can be obtained.

Additional features and advantages are described herein, and will be apparent from the following Detailed Description and the figures.

BRIEF DESCRIPTION OF THE FIGURES

FIG. 2 is a cross-sectional view showing an enlarged part of a wound electrode body in the secondary battery as shown in FIG. 1.

DETAILED DESCRIPTION

Figure 1:
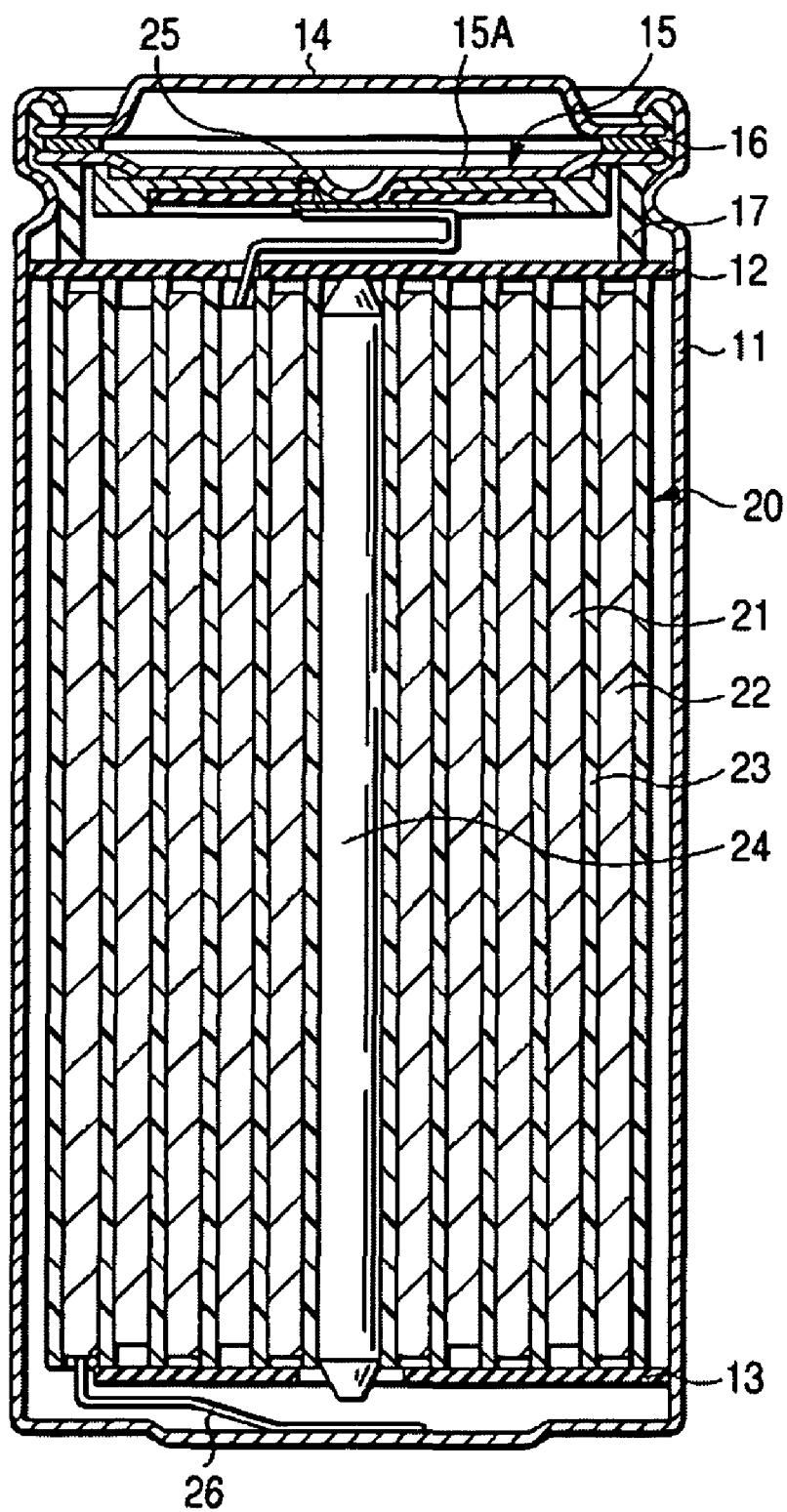
FIG. 1 is a cross-sectional view showing a configuration of a secondary battery according to an embodiment.

An embodiment will described in detail below with reference to the accompanying drawings.

FIG. 1 shows a cross-sectional structure of a secondary battery according to an embodiment. This secondary battery is of a so-called cylinder type and has a wound electrode body 20 in which strip-shaped positive electrode 21 and negative electrode 22 are wound via a separator 23 in the interior of a battery can 11 in a substantially hollow column shape. The battery can 11 is constituted of, for example, iron (Fe) plated with nickel (Ni). One end of the battery can 11 is closed, with the other end being opened. A pair of insulating plates 12 and 13 is respectively disposed perpendicular to the winding peripheral face in the interior of the battery can 11 so as to interpose the wound electrode body 20 therebetween.

In the open end of the battery can 11, a battery cover 14 and a safety valve mechanism 15 and a positive temperature coefficient (PTC) device 16 provided inside this battery cover 14 are installed upon being caulked via a gasket 17, and the interior of the battery can 11 is hermetically sealed. The battery cover 14 is constituted of, for example, a material the same as in the battery can 11. The safety valve mechanism 15 is electrically connected to the battery cover 14 via the positive temperature coefficient device 16. When an internal pressure of the battery reaches a certain level or more due to internal short circuit, heating from the exterior or the like, a disk plate 15A is reversed, thereby cutting electrical connection between the battery cover 14 and the wound electrode body 20. When the temperature rises, the positive temperature coefficient device 16 limits a current due to an increase of a resistance value, thereby preventing abnormal heat generation due to a large current from occurring. The gasket 17 is constituted of, for example, an insulating material, and its surface is coated with asphalt.

For example, a center pin 24 is inserted in the center of the wound electrode body 20. A positive electrode lead 25 made of aluminum (Al) or the like is connected to the positive electrode 21 of the wound electrode body 20; and a negative electrode lead 26 made of nickel or the like is connected to the negative electrode 22 of the wound electrode body 20. The positive electrode lead 25 is electrically connected to the battery cover 14 upon being welded with the safety valve mechanism 15; and the negative electrode lead 26 is welded with and electrically connected to the battery can 11.

FIG. 2 shows an enlarged part of the wound electrode body 20 as shown in FIG. 1. The positive electrode 21 has a structure in which, for example, a positive electrode active material layer 21B is provided on the both faces of a positive electrode collector 21A having a pair of faces opposing to each other. Though illustration is omitted, the positive electrode active material layer 21B may be provided on only one face of the positive electrode collector 21A. The positive electrode collector 21A is constituted of, for example, a metal foil such as an aluminum foil, a nickel foil and a stainless steel foil.

The positive electrode active material layer 21B is constituted so as to contain, as a positive electrode active material, for example, one or two or more kinds of a positive electrode material capable of intercalating and deintercalating lithium as an electrode reactant.

Examples of the positive electrode material capable of intercalating and deintercalating lithium include lithium-containing compounds such as a lithium oxide, a lithium sulfide, an intercalation compound containing lithium and a lithium phosphate compound. Of these, a complex oxide containing lithium and a transition metal element or a phosphate compound containing lithium and a transition metal element is preferable; and a compound containing at least one of cobalt (Co), nickel, manganese (Mn), iron, aluminum, vanadium (V) and titanium (Ti) as a transition metal element is especially preferable. A chemical formula thereof is expressed by, for example, $Li_xMIO_2$ or $Li_yMIIPO_4$. In the formulae, MI and MII each includes at least one transition metal element; and values of x and y vary depending upon the charge and discharge state of the battery and usually satisfy the relationships of $(0.05 \leq x \leq 1.10)$ and $(0.05 \leq y \leq 1.10)$.

Specific examples of the complex oxide containing lithium and a transition metal element include a lithium cobalt complex oxide ($Li_xCoO_2$), a lithium nickel complex oxide ($Li_xNiO_2$), a lithium nickel cobalt complex oxide [$Li_xNi_{1-z}Co_zO_2$ (z<1)], a lithium nickel cobalt manganese complex oxide [$Li_xNi_{(1-v-w)}Co_vMn_wO_2$ (v+w<1)] and a lithium manganese complex oxide having a spinel structure ($LiMn_2O_4$). Specific examples of the phosphate compound containing lithium and a transition metal element include a lithium iron phosphate compound ($LiFePO_4$) and a lithium iron manganese phosphate compound [$LiFe_{1-u}Mn_uPO_4$ (u<1)].

As the positive electrode material capable of intercalating and deintercalating lithium, other metal compound and a polymer material can also be exemplified. Examples of other metal compound include oxides such as titanium oxide, vanadium oxide and manganese dioxide; and disulfides such as titanium sulfide and molybdenum sulfide. Examples of the polymer material include polyaniline and polythiophene.

The positive electrode active material layer 21B may contain a conductive material or a binder as the need arises. Examples of the conductive material include carbon materials such as graphite, carbon black and ketjen black. These materials are used singly or in admixture of two or more kinds thereof. Also, besides the carbon material, a metal material, a conductive polymer material or the like may be used so far as the material is a conductive material. Examples of the binder include synthetic rubbers such as styrene-butadiene based rubber, fluorine based rubber and ethylene-propylene-diene rubber; and polymer materials such as polyvinylidene fluoride. These materials are used singly or in admixture of two or more kinds thereof.

The negative electrode 22 has, for example, a configuration in which a negative active material layer 22B is provided on the both faces of a negative electrode collector 22A. Though illustration is omitted, the negative electrode active material layer 22B may be provided on only one face of the negative electrode collector 22A. The negative electrode collector 22A is constituted of, for example, a metal foil such as a copper foil, a nickel foil and a stainless steel foil.

The negative active material layer 22B is constituted so as to contain, as a negative electrode active material, for example, one or two or more kinds of a negative electrode material capable of intercalating and deintercalating lithium as an electrode reactant. The negative electrode active material layer 22B may contain a binder the same as in the positive electrode active material layer 21B as the need arises.

Examples of the negative electrode material capable of intercalating and deintercalating lithium include carbon materials such as graphite, hardly graphitized carbon and easily graphitized carbon. Such a carbon material is preferable because a change in crystal structure to be generated at the time of charge and discharge is very little, a high charge and discharge capacity can be obtained, and favorable charge and discharge cycle characteristics can be obtained. In particular, graphite is preferable because it has a large electrochemical equivalent and is able to obtain a high energy density. The graphite may be any of natural graphite and artificial graphite.

As the graphite, one having a lattice spacing $d_{002}$ in the C-axis direction in X-ray diffraction of 0.335 nm or more and less than 0.338 nm is preferable. This is because when the lattice spacing $d_{002}$ is regulated so as to fall within this range, a higher energy density can be obtained; and also, when the lattice spacing $d_{200}$ is less than 0.335 nm, it is theoretically impossible to manufacture graphite. The lattice spacing $d_{002}$ can be measured by, for example, an X-ray diffraction method using CuKα rays as X-rays and using high-purity silicon as a standard substance (see Sugiro OTANI, *Carbon Fiber*, pages 733 to 742 (1986), Kindai Henshu Ltd.).

Furthermore, it is preferable that the graphite has a bulk density of, for example, 1.2 g/cm³ or more and a breaking strength of, for example, 50 MPa or more. This is because even when the negative electrode active material layer 22B is pressed to increase a volume density, a lamellar structure of graphite can be kept, and the intercalating and deintercalating reaction of lithium can be smoothly kept.

The breaking strength of a graphite particle can be obtained from, for example, the following expression.

$$St(Sx)=2.8P/(n \times d \times d)$$

In the foregoing expression, St(Sx) represents a breaking strength (Pa); P represents a force (N) in the test; and d represents an average particle size (mm) of the particle. The average particle size d can be measured by, for example, a laser diffraction type particle size analyzer.

As the hardly graphitized carbon, for example, one which has a lattice spacing $d_{002}$ of 0.37 nm or more and a true density of less than 1.70 g/cm³ and which does not show an exothermic peak at 700° C. or higher in differential thermal analysis (DTA) in air is preferable.

Also, in this secondary battery, by increasing the thickness of each of the positive electrode active material layers 21B and the negative electrode active material layer 22B, it is possible to relatively decrease the volume of each of the positive electrode collector 21A, the negative electrode collector 22A and the separator 23 within the battery and enhance the energy density. On the other hand, when the thickness is excessively increased, the acceptance of a lithium ion is lowered, thereby possibly causing a lowering in battery characteristics such as heavy loading characteristics and cycle characteristics.

Accordingly, a thickness of the negative electrode active material layer 22B is regulated at 70 μm or more and not more than 120 μm per one face of the negative electrode collector 22A, with a total sum on the both faces being 140 μm or more and not more than 240 μm. Also, it is preferable to regulate the thickness of the positive electrode active material layer 21B at, for example, 70 μm or more and not more than 120 μm per one face of the positive electrode collector 21A, with a total sum on the both faces being 140 μm or more and not more than 240 μm.

Furthermore, when the negative electrode active material layer 22B is formed by using graphite having a lattice spacing $d_{002}$ of 0.335 nm or more and less than 0.338 nm as the negative electrode active material, it is preferable to regulate a volume density of the negative electrode active material layer 22B at, for example, 1.0 g/cm³ or more and not more than 1.9 g/cm³. This is because by forming the foregoing graphite-containing negative electrode active material layer 22B so as to have such a volume density, the amount of the active material capable of being filled within the battery is sufficiently secured, and the acceptance of a lithium ion is enhanced.

The separator 23 isolates the positive electrode 21 and the negative electrode 22 from each other, prevents a short circuit of current to be caused due to contact of the both electrodes from occurring and passes a lithium ion therethrough. The separator 23 is constituted of, for example, a porous material made of a synthetic resin such as polytetrafluoroethylene, polypropylene and polyethylene or a porous material made of a ceramic. The separator 23 may also have a porous membrane structure in which two or more kinds of the foregoing porous materials are mixed or laminated.

Above all, a polyolefin-made porous membrane is preferable because it is excellent in an effect for preventing a short circuit from occurring and is able to devise to enhance safety of the battery due to a shutdown effect. In particular, polyethylene is preferable as a material which constitutes the separator 23 because it is able to obtain a shutdown effect within a temperature range of 100° C. or higher and not higher than 160° C. and is excellent in electrochemical stability. Also, polypropylene is preferable. Besides, a resin may be used upon being copolymerized or blended with polyethylene or polypropylene so far as it has chemical stability.

An electrolytic solution is impregnated in the separator 23. The electrolytic solution contains, for example, a solvent and an electrolyte salt.

The solvent contains 15% by mass or more and not more than 30% by mass of a cyclic carbonate represented by the following formula (1). This is because higher effects can be obtained within such a range.

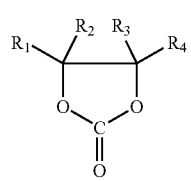

(1)

In the formula (1), $R_1$ to $R_4$ each independently represents hydrogen, a halogen, an alkyl group or a halogenated alkyl group. Examples of the halogen include fluorine, chlorine and bromine. Also, the alkyl group preferably has from 1 to 3 carbon atoms.

Examples of the cyclic carbonate represented by the formula (1) include ethylene carbonate, propylene carbonate, fluoroethylene carbonate, chloroethylene carbonate and difluoroethylene carbonate. Above all, it is preferable that the cyclic carbonate solvent includes propylene carbonate or ethylene carbonate. This is because excellent charge and discharge capacity characteristics and charge and discharge cycle characteristics can be obtained. Also, such a cyclic carbonate may be used singly or in admixture of plural kinds thereof.

Also, a halogenated cyclic carbonate is contained in the cyclic carbonate represented by the formula (1). This is because by containing such a halogenated cyclic carbonate, a favorable coat can be formed on the negative electrode 22, and even by increasing the thickness of the negative electrode active material layer 22B as described previously, diffusion and electrochemical acceptance of a lithium ion in the negative electrode 22 can be enhanced.

A mass content ratio (B/A) of the halogenated cyclic carbonate (B % by mass) in the cyclic carbonate (A % by mass) which is represented by the formula (1) is regulated at from 0.5 to 1.0. This is because by making the subject mass content ratio fall within this range, it is possible to decrease activation energy accompanying desolvation on a negative electrode active material/electrolytic solution interface, and excellent heavy loading characteristics can be obtained.

Examples of the halogenated cyclic carbonate include fluoroethylene carbonate, chloroethylene carbonate and bromoethylene carbonate. Of these, fluoroethylene carbonate is preferable. Such a halogenated cyclic carbonate may be used singly or in admixture of plural kinds thereof.

Examples of other solvent include ambient temperature molten salts such as butylene carbonate, vinylene carbonate, dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, ethyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfite and bistrifluoromethylsulfonylimidotrimethylhexyl ammonium.

Examples of the electrolyte salt include lithium salts such as lithium hexafluorophosphate ($LiPF_6$), lithium bis(pentafluoroethanesulfonyl)imide [$Li(C_2F_5SO_2)_2N$], lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl) imide [$Li(CF_3SO_2)_2N$], methyl lithium tris(trifluoromethanesulfonyl) [$LiC(SO_2CF_3)_3$], lithium chloride (LiCl) and lithium bromide (LiBr). Such an electrolyte salt may be used singly or in admixture of two or more kinds thereof. Above all, it is preferable that lithium hexafluorophosphate ($LiPF_6$) is contained.

This secondary battery can be, for example, manufactured in the following manner.

First of all, for example, the positive electrode active material layer 21B is formed on the positive electrode collector 21A to prepare the positive electrode 21. A positive electrode active material, a conductive material and a binder are mixed to prepare a positive electrode mixture. This positive electrode mixture is dispersed in a solvent such as N-methyl-2-pyrrolidone to form a pasty positive electrode mixture slurry. Subsequently, this positive electrode mixture slurry is coated on the positive electrode collector 21A, and the solvent is then dried. Thereafter, the resultant is compression molded by a rolling press machine or the like to form the positive electrode active material layer 21B. The positive electrode active material layer 21B may also be formed by sticking the positive electrode mixture onto the positive electrode collector 21A.

Also, for example, similar to the case in the positive electrode 21, the negative electrode active material layer 22B is formed on the negative electrode collector 22A to prepare the negative electrode 22. A carbon material as a negative electrode active material and a binder are mixed to prepare a negative electrode mixture, and this negative electrode mixture is dispersed in a solvent such as N-methyl-2-pyrrolidone to form a pasty negative electrode mixture slurry. Subsequently, this negative electrode mixture slurry is coated on the negative electrode collector 22A, and the solvent is then dried. Thereafter, the resultant is compression molded by a rolling press machine or the like to form the negative electrode active material layer 22B, thereby preparing the negative electrode 22. The negative electrode active material layer 22B may also be formed by sticking the negative electrode mixture onto the negative electrode collector 21A.

Next, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded with the safety valve mechanism 15; and a tip end of the negative electrode lead 26 is welded with the battery can 11. The wound positive electrode 21 and negative electrode 22 are interposed between a pair of the insulating plates 12 and 13 and contained in the interior of the battery can 11. After the positive electrode 21 and the negative electrode 22 are contained in the interior of the battery can 11, an electrolytic solution is injected into the interior of the battery can 11 and impregnated in the separator 23. Thereafter, the battery cover 14, the safety valve mechanism 15 and the positive temperature coefficient device 16 are fixed to the open end of the battery can 11 upon being caulked via the gasket 17. There is thus completed the secondary battery as shown in FIG. 1.

In this secondary battery, when charged, for example, a lithium ion is deintercalated from the positive electrode active material layer 21B and intercalated in the negative electrode active material layer 22B via the electrolytic solution. Also, when discharged, for example, a lithium ion is deintercalated from the negative electrode active material layer 22B and intercalated in the positive electrode active material layer 21B via the electrolytic solution. On that occasion, in this embodiment, since the thickness of each of the positive electrode active material layer 21B and the negative electrode active material layer 22B is increased, an area of each of the positive electrode collector 21A and the negative electrode collector 22A relatively decreases, and a current density to be applied to the negative electrode 22 at the time of charge increases.

However, in this embodiment, since the halogenated cyclic carbonate is contained in the electrolytic solution, a favorable coat is formed on the negative electrode 22. Consequently, even when the current density to be applied to the negative electrode 22 is high, not only diffusion and electrochemical acceptance of a lithium ion on the negative electrode 22 are enhanced, but deposition of metallic lithium on the negative electrode 22 is inhibited.

Also, since the mass content ratio (B/A) of the halogenated cyclic carbonate (B % by mass) contained in the cyclic carbonate (A % by mass) which is represented by the formula (1) is regulated at from 0.5 to 1.0, it is possible to decrease activation energy accompanying desolvation on a negative electrode active material/electrolytic solution interface, and excellent heavy loading characteristics can be obtained.

As described previously, according to this embodiment, since an appropriate thickness on each of the positive electrode active material layer 21B and the negative electrode active material layer 22B is secured, favorable heavy loading characteristics and cycle characteristics can be obtained while enhancing the energy density. Furthermore, since the electrolytic solution includes a halogenated cyclic carbonate as the solvent, a favorable coat is formed on the negative electrode 22. Consequently, even when the thickness of the negative electrode active material layer 22B is increased, not only diffusion and acceptance of a lithium ion on the negative electrode 22 are enhanced, but decomposition of the electrolytic solution accompanying charge and discharge is inhibited. Accordingly, deposition of metallic lithium on the negative electrode 22 can be inhibited. Also, it is possible to devise to further enhance cycle characteristics.

In particular, since the mass content ratio (B/A) of the halogenated cyclic carbonate (B % by mass) contained in the cyclic carbonate (A % by mass) which is represented by the formula (1) is regulated at from 0.5 to 1.0, it is possible to decrease activation energy accompanying desolvation on a negative electrode active material/electrolytic solution interface, and excellent heavy loading characteristics can be obtained. Thus, such is more effective.

Furthermore, by using graphite having a lattice spacing $d_{002}$ in the C-axis direction in X-ray diffraction of 0.335 nm or more and less than 0.338 nm as a carbon material to be contained in the negative electrode active material layer 22B, a higher energy density can be obtained. Also, when graphite having a narrow lattice spacing as 0.335 nm or more and less than 0.338 nm is used, in general, an activation barrier accompanying desolvation on a negative electrode active material/ electrolytic solution interface is large, and loading characteristics are extremely lowered. However, since the mass content ratio (B/A) of the halogenated cyclic carbonate (B % by mass) contained in the cyclic carbonate (A % by mass) which is represented by the formula (1) is regulated at from 0.5 to 1.0, it is possible to obtain excellent heavy loading characteristics.

Here, since the halogenated cyclic carbonate is contained in the electrolytic solution, even in the foregoing graphite having a small lattice spacing $d_{002}$, intercalation of a lithium ion at an edge of the graphite crystal is smoothly conducted, and the battery characteristics such as cycle characteristics are not deteriorated. That is, acceptance of a lithium ion which is substantially equal to that of a carbon material having a lattice spacing of 0.338 nm or more is secured. It may be considered to be caused due to the matter that the lithium ion rapidly moves in the edge, and as a result, a rate of taking in a lithium ion as lithium between the layers is enhanced.

Furthermore, in the case where the negative electrode active material layer 22B is formed by using graphite having a lattice spacing $d_{002}$ of 0.335 nm or more and less than 0.338 nm as a negative electrode active material, when the negative electrode active material layer 22B is regulated so as to have a volume density of 1.0 g/cm$^3$ or more and not more than 1.9 g/cm$^3$, the amount of the active material capable of being filled within the battery is sufficiently secured, a high energy density is secured, and acceptance of a lithium ion is enhanced. In that case, in particular, not only a high energy density can be obtained, but excellent cycle characteristics can be obtained due to a coating effect of the halogenated cyclic carbonate and a low desolvation activation barrier.

While the present application has been described with reference to the foregoing embodiment, it should not be construed that the present application is limited thereto, and various modifications may be made. For example, in the foregoing embodiment, the battery using lithium as an electrode reactant has been described. However, the present application can be applied to the case of using other alkali metal such as sodium (Na) and potassium (K), an alkaline earth metal such as magnesium and calcium (Ca), or other light metal such as aluminum. On that occasion, the positive electrode active material capable of intercalating and deintercalated an electrode reactant and the like are selected depending upon the electrode reactant.

Also, in the foregoing embodiment, the secondary battery of a cylinder type provided with a battery device having a winding structure has been specifically described. However, the present application is similarly applicable to a secondary battery provided with a battery device of an oval type or a polygonal type having a winding structure, or a secondary battery provided with a battery device having other structure in which a positive electrode and a negative electrode are folded, or plural positive electrodes and negative electrodes are laminated. In addition, the present application is similarly applicable to secondary batteries having other exterior shape such as a coin type, a button type, a square type and a laminated film type.

Also, in the foregoing embodiment, the thickness of the positive electrode active material layer as well as the thickness of the negative electrode active material layer has been increased as compared with the usual thickness. However, the thickness of the positive electrode active material layer may be decreased to, for example, about 55 μm or more and not more than about 70 μm per one face, with a total sum on the both faces being about 110 μm or more and not more than about 140 μm.

Also, in the foregoing embodiment, the case of using a liquid electrolytic solution as an electrolyte has been described. However, an electrolyte in a gel form in which an electrolytic solution is held in a holding body such as a polymer compound may be used.

Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile butadiene rubber, polystyrene and polycarbonate. In particular, polyacrylonitrile, polyvinylidene fluoride, polyhexafluoropropylene and polyethylene oxide are preferable in view of electrochemical stability. A ratio of the polymer compound to the electrolytic solution varies with compatibility therebetween. In general, it is preferable to add the polymer compound in an amount corresponding to 5% by mass or more and not more than 50% by mass of the electrolytic solution.

Moreover, in the foregoing embodiment, with respect to the thickness of the negative electrode active material layer, the lattice spacing $d_{002}$ in the C-axis direction calculated by X-ray diffraction of the carbon material and the content ratio of the halogenated cyclic carbonate contained in the electrolytic solution in the battery according to the embodiment, appropriate ranges derived from the results of the Examples have been described. However, the subject description does not completely deny a possibility that parameters such as the thickness fall outside the foregoing ranges. That is, the foregoing appropriate ranges are an especially preferable range only for the purpose of obtaining the effects of the embodiment. Parameters such as the thickness may be slightly deviated from the foregoing ranges so far as the effects of the embodiment.

EXAMPLES

The embodiment is specifically described below in detail with reference to the following Examples. However, it should not be construed that the present application is limited to these Examples.

Examples 1-1 to 1-6 and Comparative Examples 1-1 to 1-4

The secondary battery of a cylinder type as shown in FIGS. 1 and 2 was prepared. First of all, lithium carbonate ($Li_2CO_3$) and cobalt carbonate ($CoCO_3$) were mixed in a molar ratio of $Li_2CO_3/CoCO_3$ of 0.5/1, and the mixture was baked in air at 900° C. for 5 hours to obtain a lithium cobalt complex oxide ($LiCoO_2$). The obtained $LiCoO_2$ was subjected to X-ray diffraction. The result was well consistent with a peak of $LiCoO_2$ registered in the JCPDS (Joint Committee of Powder Diffraction Standard) file. Next, this lithium cobalt complex oxide was pulverized to form a positive electrode active material in a powder form having an accumulated 50% particle size obtained by laser diffraction of 15 μm.

Subsequently, 95% by mass of this lithium cobalt complex oxide powder and 5% by mass of a lithium carbonate ($Li_2CO_3$) powder were mixed; 94% by mass of this mixture, 3% by mass of ketjen black as a conductive material and 3% by mass of polyvinylidene fluoride as a binder were mixed; and the resulting mixture was dispersed in N-methyl-2-pyrrolidone as a solvent to form a positive electrode mixture slurry.

Next, this positive electrode mixture slurry was uniformly coated on the both faces of the positive electrode collector 21A made of a strip-shaped aluminum foil having a thickness of 20 μm and dried. The resultant was compression molded to form the positive electrode active material layer 21B, thereby preparing the positive electrode 21. On that occasion, a thickness of one face of the positive electrode active material layer 21B was 88 μm, and a volume density thereof was 3.55 g/cm$^3$. Thereafter, the positive electrode lead 25 made of aluminum was installed in one end of the positive electrode collector 21A.

Also, 90% by mass of a granular graphite powder having an average particle size of 25 μm as a negative electrode active material and 10% by mass of polyvinylidene fluoride as a binder were mixed, and the mixture was dispersed in N-methyl-2-pyrrolidone as a solvent to form a negative electrode mixture slurry. As to physical properties of graphite to be used as the negative electrode active material, a lattice spacing $d_{002}$ in the C-axis direction calculated by X-ray diffraction was 0.3363 nm.

Next, this negative electrode mixture slurry was uniformly coated on the both faces of the negative electrode collector 22A made of a strip-shaped copper foil having a thickness of 15 μm and dried. The resultant was compression molded to form the negative electrode active material layer 22B, thereby preparing the negative electrode 22. On that occasion, a thickness of one face of the negative electrode active material layer 22B was 90 μm, and a volume density thereof was 1.80 g/cm$^3$. Subsequently, the negative electrode lead 26 made of nickel was installed in one end of the negative electrode collector 22A.

After the positive electrode 21 and the negative electrode 22 were respectively formed, the positive electrode 21 and the negative electrode 22 were laminated via the separator 23 made of a microporous polyethylene stretched film having a thickness of 25 μm in the order of the negative electrode 22, the separator 23, the positive electrode 21 and the separator 23. The resulting laminate was wound many times, thereby preparing the wound electrode body 20 of a jelly roll type. Next, the wound electrode body 20 was interposed between a pair of the insulating plates 12 and 13; not only the negative electrode lead 26 was welded with the battery can 11, but the positive electrode lead 25 was welded with the safety valve mechanism 15; and the wound electrode body 20 was then contained in the interior of the battery can 11. Subsequently, an electrolytic solution was injected into the interior of the battery can 11, and the battery cover 14 was caulked with the battery can 11 via the gasket 17, thereby preparing a secondary battery of a cylinder type.

On that occasion, a solution prepared by dissolving, as an electrolyte salt, lithium hexafluorophosphate in a proportion of 1 mol/kg in a mixed solvent of ethylene carbonate (EC), propylene carbonate (PC), fluoroethylene carbonate (FEC) and/or chloroethylene carbonate (ClEC) as a cyclic carbonate and diethyl carbonate (DEC) and methyl ethyl carbonate (MEC) as a chain carbonate was used as the electrolytic solution. The content of the cyclic carbonate represented by the formula (1) in the solvent was regulated at 20% by mass, and the content of the halogenated cyclic carbonate (FEC and ClEC) in the cyclic carbonate represented by the formula (1) was changed.

Each of the secondary batteries prepared in Examples 1-1 to 1-6 and Comparative Examples 1-1 to 1-4 was subjected to charge and discharge and examined with respect to battery capacity, initial charge and discharge efficiency and cycle characteristics. On that occasion, charge was performed at a constant current of 1 C until a battery voltage reached 4.2 V and then performed at a constant voltage of 4.2 V until a total charge time reached 4 hours; and discharge was performed at a constant current of 1 C until a battery voltage reached 3.0 V. "1 C" as referred to herein represents a current value at which a theoretical capacity is completely discharged within one hour. An initial discharge capacity (discharge capacity at the first cycle) was defined for the battery capacity; and a ratio of the discharge capacity at the 100th cycle to the initial discharge capacity (discharge capacity at the first cycle), namely [{(discharge capacity at the 100th cycle)/(discharge capacity at the first cycle)}×100(%)] was defined for the cycle characteristics. The results are shown in Table 1. The battery capacity is expressed as a relative value while taking the value of Comparative Example 1-1 as 100.

Examples 2-1 to 2-2 and Comparative Examples 2-1 to 2-12

Secondary batteries were prepared in the same manner as in Comparative Example 1-1, except for changing the amount of fluoroethylene carbonate (FEC) as the halogenated cyclic carbonate without changing the amount of each of ethylene carbonate (EC) and propylene carbonate (PC) as the cyclic carbonate. Each of the secondary batteries prepared in Examples 2-1 and 2-2 and Comparative Examples 2-1 to 2-12 was examined with respect to battery capacity, initial charge and discharge efficiency and cycle characteristics in the same manner as in Comparative Example 1-1. The results are shown in Table 2. The battery capacity is expressed as a relative value while taking the value of Comparative Example 1-1 as 100.

Comparative Examples 3-1 to 3-8

Secondary batteries were prepared and evaluated in the same manner as in Example 1-1, except for regulating the thickness on one face of the negative electrode active substance layer 22B at 60 μm and changing the amount of fluoroethylene carbonate (FEC) as the halogenated cyclic carbon. Each of the secondary batteries prepared in Comparative Examples 3-1 to 3-8 was examined with respect to battery capacity, initial charge and discharge efficiency and cycle characteristics in the same manner as in Comparative Example 1-1. The results are shown in Table 3. The battery capacity is expressed as a relative value while taking the value of Comparative Example 1-1 as 100.

TABLE 1

Negative electrode active material layer: Volume density: 1.80 g/cm$^3$

| | Composition of solvent (mass ratio in the whole of solvents: %) | | | | Ratio of FEC (mass ratio of cyclic carbonate) | Ratio of cyclic carbonate (mass ratio in the whole of solvents) | LiPF$_6$ | Thickness of coat on one face of negative electrode active material layer | Battery capacity (relative value) | Cycle characteristics |
|---|---|---|---|---|---|---|---|---|---|---|
| | EC | PC | FEC | ClEC | % | % | (mol/kg) | (μm) | (%) | (%) |
| Example 1-1 | 8.0 | 2.0 | 10.0 | — | 50 | 20 | 1.0 | 90 | 100 | 66.7 |
| Example 1-2 | 6.4 | 1.6 | 12.0 | — | 60 | 20 | 1.0 | 90 | 100 | 78.6 |

TABLE 1-continued

Negative electrode active material layer: Volume density: 1.80 g/cm³

|  | Composition of solvent (mass ratio in the whole of solvents: %) | | | | Ratio of FEC (mass ratio of cyclic carbonate) | Ratio of cyclic carbonate (mass ratio in the whole of solvents) | $LiPF_6$ | Thickness of coat on one face of negative electrode active material layer | Battery capacity (relative value) | Cycle characteristics |
|---|---|---|---|---|---|---|---|---|---|---|
|  | EC | PC | FEC | CIEC | % | % | (mol/kg) | (μm) | (%) | (%) |
| Example 1-3 | 4.0 | 1.0 | 15.0 | — | 75 | 20 | 1.0 | 90 | 100 | 84.2 |
| Example 1-4 | 4.0 | 1.0 | — | 15.0 | 75 | 20 | 1.0 | 90 | 100 | 70.3 |
| Example 1-5 | 4.0 | 1.0 | 7.5 | 7.5 | 75 | 20 | 1.0 | 90 | 100 | 76.5 |
| Example 1-6 | 0.0 | 0.0 | 20.0 | — | 100 | 20 | 1.0 | 90 | 100 | 89.9 |
| Comparative Example 1-1 | 16.0 | 4.0 | 0.0 | — | 0 | 20 | 1.0 | 90 | 100 | 46.3 |
| Comparative Example 1-2 | 15.2 | 3.8 | 1.0 | — | 5 | 20 | 1.0 | 90 | 100 | 46.5 |
| Comparative Example 1-3 | 12.0 | 3.0 | 5.0 | — | 25 | 20 | 1.0 | 90 | 100 | 47.5 |
| Comparative Example 1-4 | 9.6 | 2.4 | 8.0 | — | 40 | 20 | 1.0 | 90 | 100 | 49.7 |

TABLE 2

|  | Composition of solvent (mass ratio in the whole of solvents: %) | | | Ratio of FEC (mass ratio of cyclic carbonate) | Ratio of cyclic carbonate (mass ratio in the whole of solvents) | $LiPF_6$ | Thickness of coat on one face of negative electrode active material layer | Battery capacity (relative value) | Cycle characteristics |
|---|---|---|---|---|---|---|---|---|---|
|  | EC | PC | FEC | % | % | (mol/kg) | (μm) | (%) | (%) |
| Comparative Example 2-1 | 5.2 | 1.3 | 6.5 | 50 | 13 | 1.0 | 90 | 100 | 30.8 |
| Comparative Example 2-2 | 4.0 | 1.0 | 8.0 | 62 | 13 | 1.0 | 90 | 100 | 32.5 |
| Example 2-1 | 6.0 | 1.5 | 7.5 | 50 | 15 | 1.0 | 90 | 100 | 56.4 |
| Example 1-1 | 8.0 | 2.0 | 10.0 | 50 | 20 | 1.0 | 90 | 100 | 66.7 |
| Example 2-2 | 12.0 | 3.0 | 15.0 | 50 | 30 | 1.0 | 90 | 100 | 62.4 |
| Comparative Example 2-3 | 16.0 | 4.0 | 20.0 | 50 | 40 | 1.0 | 90 | 100 | 38.6 |
| Comparative Example 2-4 | 16.0 | 4.0 | 40.0 | 67 | 60 | 1.0 | 90 | 100 | 25.6 |
| Comparative Example 2-5 | 16.0 | 4.0 | 60.0 | 75 | 80 | 1.0 | 90 | 100 | 10.1 |
| Comparative Example 1-1 | 16.0 | 4.0 | 0.0 | 0 | 20 | 1.0 | 90 | 100 | 46.3 |
| Comparative Example 2-6 | 16.0 | 4.0 | 1.0 | 5 | 21 | 1.0 | 90 | 100 | 47.6 |
| Comparative Example 2-7 | 16.0 | 4.0 | 5.0 | 20 | 25 | 1.0 | 90 | 100 | 47.8 |
| Comparative Example 2-8 | 16.0 | 4.0 | 8.0 | 29 | 28 | 1.0 | 90 | 100 | 48.5 |
| Comparative Example 2-9 | 16.0 | 4.0 | 10.0 | 33 | 30 | 1.0 | 90 | 100 | 50.8 |
| Comparative Example 2-10 | 16.0 | 4.0 | 12.0 | 38 | 32 | 1.0 | 90 | 100 | 49.7 |
| Comparative Example 2-11 | 16.0 | 4.0 | 15.0 | 43 | 35 | 1.0 | 90 | 100 | 46.3 |
| Comparative Example 2-12 | 8.0 | 2.0 | 4.0 | 29 | 14 | 1.0 | 90 | 100 | 19.6 |

TABLE 3

Negative electrode active material layer: Volume density: 1.80 g/cm³

| | Composition of solvent (mass ratio in the whole of solvents: %) | | | Ratio of FEC (mass ratio of cyclic carbonate) | Ratio of cyclic carbonate (mass ratio in the whole of solvents) | $LiPF_6$ | Thickness of coat on one face of negative electrode active material layer | Battery capacity (relative value) | Cycle characteristics |
|---|---|---|---|---|---|---|---|---|---|
| | EC | PC | FEC | % | % | (mol/kg) | (μm) | (%) | (%) |
| Comparative Example 3-1 | 16.0 | 4.0 | 0.0 | 0 | 20 | 10 | 60 | 91.3 | 92.2 |
| Comparative Example 3-2 | 15.2 | 3.8 | 1.0 | 5 | 20 | 10 | 60 | 91.3 | 92.4 |
| Comparative Example 3-3 | 12.0 | 3.0 | 5.0 | 25 | 20 | 10 | 60 | 91.3 | 92.4 |
| Comparative Example 3-4 | 9.6 | 2.4 | 8.0 | 40 | 20 | 10 | 60 | 91.3 | 92.6 |
| Comparative Example 3-5 | 8.0 | 2.0 | 10.0 | 50 | 20 | 10 | 60 | 91.3 | 92.7 |
| Comparative Example 3-6 | 6.4 | 1.6 | 12.0 | 60 | 20 | 10 | 60 | 91.3 | 93.1 |
| Comparative Example 3-7 | 4.0 | 1.0 | 15.0 | 75 | 20 | 10 | 60 | 91.3 | 93.1 |
| Comparative Example 3-8 | 0.0 | 0.0 | 20.0 | 100 | 20 | 10 | 60 | 91.3 | 93.4 |

As shown in Table 1, in Examples 1-1 to 1-6 and Comparative Examples 1-1 to 1-4 in which the thickness of the negative electrode active material layer 22B was increased, when the amount of the halogenated cyclic carbonate (FEC and ClEC) in the cyclic carbonate was from 50 to 100% by mass, the cyclic characteristics could be largely enhanced. When the amount of the halogenated cyclic carbonate in the cyclic carbonate was less than 50% by mass, the activation barrier accompanying desolvation was too large so that a cycle improving effect was not substantially found.

As shown in Table 2, when the amount of the halogenated cyclic carbonate (FEC) in the cyclic carbonate was from 50 to 100% by mass, and the content of the cyclic carbonate in the solvent was 15% by mass or more and not more than 30% by mass, favorable cyclic characteristics were obtained.

Even in the case where the amount of halogenated cyclic carbonate (FEC) in the cyclic carbonate was from 50 to 100% by mass, when the amount of the cyclic carbonate in the solvent was more than 30% by mass, the activation barrier accompanying desolvation was too large so that the cycle characteristics were lowered. Also, even in the case where the amount of the halogenated cyclic carbonate (FEC) in the cyclic carbonate was from 50 to 100% by mass, when the amount of the cyclic carbonate in the solvent was less than 15% by mass, the solubility of the Li salt was low. Therefore, the mobility of an Li ion in the electrolytic solution was lowered, and the electrode was swollen due to the generation of a gas. As a result, the cycle characteristics were lowered.

Also, it was noted from the results as shown in Tables 1 and 3 that so far as the negative electrode active material layer 22B using the same carbon material and having the same volume density is concerned, when the thickness of the negative electrode active material layer 22B was increased, a large battery capacity was obtained.

As shown in Table 3, in Comparative Examples 3-1 to 3-8 in which the thickness of the negative electrode active material layer 22B was increased, the cycle characteristics were relatively favorable even in Comparative Example 3-1 in which the halogenated cyclic carbonate (FEC) was not added. Thus, it was noted that when the thickness of the negative electrode active material layer 22B was decreased, a large improving effect due to the addition of the halogenated cyclic carbonate was not found.

That is, it was noted that by adding an appropriate amount of the cyclic carbonate in the electrolytic solution and containing the halogenated cyclic carbonate in the cyclic carbonate while securing a high battery capacity by increasing the thickness of the negative electrode active material layer 22B, excellent cycle characteristics can be realized. In particular, it has become clear that the amount of the halogenated cyclic carbonate in the cyclic carbonate is every important in an effect for reducing the activation energy accompanying an interfacial reaction.

Examples 4-1 to 4-3 and Comparative Examples 4-1 to 4-5

Secondary batteries were prepared in the same manner as in Example 1-3, except for changing the thickness on one face of the negative electrode active material layer 22B within the range of from 70 μm to 120 μm as shown in Table 4 as described later. Specifically, in Example 4-1, the thickness on one face of the negative electrode active material layer 22B was regulated at 70 μm; in Example 4-2, the thickness on one face of the negative electrode active material layer 22B was regulated at 100 μm; and in Example 4-3, the thickness on one face of the negative electrode active material layer 22B was regulated at 120 μm.

As Comparative Example 4-1 relative to Examples 4-1 to 4-3, a secondary battery was prepared in the same manner as in Example 1-3, except for regulating the thickness on one face of the negative electrode active material layer at 130 μm. Also, in Comparative Examples 4-2 to 4-5, secondary batteries were prepared in the same manner as in Examples 4-1 to 4-3, except for not adding fluoroethylene carbonate (FEC) as the halogenated cyclic carbonate in the electrolytic solution. Also, in Comparative Example 4-5, a secondary battery was prepared in the same manner as in Comparative Example 4-1, except for not adding fluoroethylene carbonate in the electrolytic solution.

Each of the secondary batteries prepared in Examples 4-1 to 4-3 and Comparative Examples 4-1 to 4-5 was examined with respect to battery capacity, initial charge and discharge efficiency and cycle characteristics in the same manner as in Example 1-3. The results are shown in Table 4 along with the results in Example 1-3 and Comparative Examples 1-1, 3-1 and 3-7. The battery capacity is expressed as a relative value while taking the value of Comparative Example 1-1 as 100.

TABLE 4

| | Composition of solvent (mass ratio in the whole of solvents: %) | | | Ratio of FEC (mass ratio of cyclic carbonate) | Ratio of cyclic carbonate (mass ratio in the whole of solvents) | $LiPF_6$ | Thickness of coat on one face of negative electrode active material layer | Battery capacity (relative value) | Cycle characteristics |
|---|---|---|---|---|---|---|---|---|---|
| | EC | PC | FEC | % | % | (mol/kg) | (μm) | (%) | (%) |
| Comparative Example 3-7 | 4.0 | 1.0 | 15.0 | 75 | 20 | 10 | 60 | 91.3 | 93.1 |
| Example 4-1 | 4.0 | 1.0 | 15.0 | 75 | 20 | 1.0 | 70 | 95.7 | 90.2 |
| Example 1-3 | 4.0 | 1.0 | 15.0 | 75 | 20 | 1.0 | 90 | 100 | 84.2 |
| Example 4-2 | 4.0 | 1.0 | 15.0 | 75 | 20 | 1.0 | 100 | 100.8 | 78.6 |
| Example 4-3 | 4.0 | 1.0 | 15.0 | 75 | 20 | 1.0 | 120 | 102.2 | 69.7 |
| Comparative Example 4-1 | 4.0 | 1.0 | 15.0 | 75 | 20 | 1.0 | 130 | 104.3 | 38.6 |
| Comparative Example 3-1 | 16.0 | 4.0 | 0.0 | 0 | 20 | 1.0 | 70 | 91.3 | 92.2 |
| Comparative Example 4-2 | 16.0 | 4.0 | 0.0 | 0 | 20 | 1.0 | 75 | 95.7 | 76.6 |
| Comparative Example 1-1 | 16.0 | 4.0 | 0.0 | 0 | 20 | 1.0 | 90 | 100 | 46.3 |
| Comparative Example 4-3 | 16.0 | 4.0 | 0.0 | 0 | 20 | 1.0 | 100 | 100.8 | 40.2 |
| Comparative Example 4-4 | 16.0 | 4.0 | 0.0 | 0 | 20 | 1.0 | 120 | 102.2 | 39.5 |
| Comparative Example 4-5 | 16.0 | 4.0 | 0.0 | 0 | 20 | 1.0 | 130 | 104.3 | 35.8 |

Negative electrode active material layer: Volume density: 1.80 g/cm³

As shown in Table 4, by regulating the thickness of the negative electrode active material layer 22B at 70 μm or more and not more than 120 μm and containing fluoroethylene carbonate, the cycle characteristics could be largely enhanced. On the other hand, when the thickness of the negative electrode active material layer 22B was thicker than 120 μm, even by containing the halogenated cyclic carbonate (FEC), the cycle characteristics could not be enhanced It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
an electrolytic solution;
a positive electrode; and
a negative electrode, wherein
the negative electrode has a negative electrode active material layer containing a carbon material and having a thickness per one face of 70 μm or more and not more than 120 μm,
the electrolytic solution contains a solvent containing 15% by mass or more and not more than 30% by mass of a cyclic carbonate represented by the following formula (1):

wherein $R_1$ to $R_4$ each independently represents hydrogen, a halogen, an alkyl group or a halogenated alkyl group, and
a mass content ratio (B/A) of a halogenated cyclic carbonate (B % by mass) contained in the cyclic carbonate (A % by mass) which is represented by the formula (1) is from 0.5 to 1.0; and
wherein the halogenated cyclic carbonate is monofluoroethylene carbonate.

2. The battery according to claim 1, wherein the carbon material includes graphite having a lattice spacing $d_{002}$ in the C-axis direction in X-ray diffraction of 0.335 nm or more and less than 0.338 nm.

3. The battery according to claim 1, wherein the cyclic carbonate represented by the formula (1) include propylene carbonate.

4. The battery according to claim 1, wherein the cyclic carbonate represented by the formula (1) include ethylene carbonate.

* * * * *